United States Patent [19]
Yoshida

[11] Patent Number: 5,220,439
[45] Date of Patent: Jun. 15, 1993

[54] FACSIMILE APPARATUS HAVING IMPROVED MEMORY CONTROL FOR ERROR-CORRECTING AND NON-ERROR-CORRECTING MODES

[75] Inventor: Takehiro Yoshida, Tokyo, Japan

[73] Assignee: Canon Kabushiki Kaisha, Tokyo, Japan

[21] Appl. No.: 841,276

[22] Filed: Feb. 26, 1992

Related U.S. Application Data

[63] Continuation of Ser. No. 352,830, May 16, 1989.

[30] Foreign Application Priority Data

May 17, 1988 [JP]  Japan .................................. 63-121087

[51] Int. Cl.$^5$ ............................................. H04N 1/32
[52] U.S. Cl. .................................... 358/404; 395/550; 358/405
[58] Field of Search ................... 364/DIG. 1, DIG. 2; 395/200, 575; 358/400, 404, 426, 405, 261.2, 406, 434, 438, 449, 296

[56] References Cited

U.S. PATENT DOCUMENTS

| | | | |
|---|---|---|---|
| 4,712,139 | 12/1987 | Kato | 358/257 |
| 4,717,967 | 1/1988 | Yoshida | 358/296 |
| 4,772,955 | 9/1988 | Kurahayashi et al. | 358/442 |
| 4,860,110 | 8/1989 | Kokubu | 358/400 |
| 4,887,162 | 12/1989 | Yoshida | 358/400 |
| 4,947,345 | 8/1990 | Paradise et al. | 364/519 |
| 4,965,676 | 10/1990 | Ejiri et al. | 358/406 |
| 4,975,783 | 12/1990 | Takaoka | 358/404 |
| 4,991,200 | 2/1991 | Lin | 379/100 |
| 4,994,926 | 2/1991 | Gordon et al. | 358/400 |

Primary Examiner—David L. Clark
Assistant Examiner—John Loomis
Attorney, Agent, or Firm—Fitzpatrick, Cella, Harper & Scinto

[57] ABSTRACT

There is disclosed a facsimile apparatus capable of communication of image information in the error correction mode and in the memory communication mode, the same memory means in common in both modes, thus economizing the memory capacity required in the apparatus. The communication in the error correction mode is controlled according to the available capacity of the memory.

18 Claims, 10 Drawing Sheets

FACSIMILE APPARATUS HAVING IMPROVED MEMORY CONTROL FOR ERROR-CORRECTING AND NON-ERROR-CORRECTING MODES

This application is a continuation of application Ser. No. 07/352,830 filed May 16, 1989.

BACKGROUND OF THE INVENTION

1. Field of the Invention

The present invention relates to a facsimile apparatus, and in particular to a facsimile apparatus with error correcting function.

2. Related Background Art

Conventional facsimile apparatus with error correction mode (or error resending mode) is provided with a memory space (or memory area) for error image resending, in addition to a memory space for substituted reception.

In the conventional error resending mode, upon detection of an error, the receiver unit sends a NACK (non-acknowledgement) signal through a backward channel thereby interrupting the transmission from the transmitter unit. In this case, a large memory is not required in the receiver unit since it can consecutively decode and record error-free data. Also the transmitter unit can identify proper data reception by the receiver unit if the NACK signal is not received within a predetermined time after the transmission of data of a frame, and can store new data in a memory space used for storing the transmitted data. Said predetermined time is variable depending for example on the frame size, ability for detecting the NACK signal, and tolerance for the delay in the transmission channel, but can be, for example, about 5 seconds. For a data transmission rate of 9600 h/s, the memory space required for the data during 5 seconds is 6 Kbytes, so that a large memory capacity is not required.

However, the error correction mode at least requires a memory capacity of 64 Kbytes, or 128 Kbytes if a double buffer structure (each buffer with 64 Kbytes) is adopted for reducing the flow control (control for interruption). A memory capacity of 128 Kbytes can store 6 to 7 sheets of CCITT No. 1 chart when transmitted in the standard mode.

Thus, the use of a separate memory space for the above-explained memory correction, in addition to the memory space for memory communication mode, is quite inefficient in consideration of the effective utilization of the momory spaces.

In relation to the error resending mode, the present applicant already filed U.S. patent applications Ser. Nos. 110,542 (Oct. 20, 1987), now U.S. Pat. No. 4,829,524, 847,684 (Apr. 3, 1986,), now U.S. Pat. No. 4,885,755 and 162,266 (Feb. 26, 1988), now U.S. Pat. No. 4,897,831.

SUMMARY OF THE INVENTION

An object of the present invention is to provide an improved facsimile apparatus free from the above-mentioned drawbacks.

Another object of the present invention is to improve the efficiency of use of memory, by utilizing a memory in common in the error correction mode and in the ordinary memory communication mode.

Still another object of the present invention is to enable communication in the error correction mode according to the available capacity of the memory.

Still another object of the present invention is to provide a facsimile apparatus capable of discriminating availability of communication function in the error correction mode according to the available memory capacity.

Still another object of the present invention is to provide a facsimile apparatus capable of altering the buffer control for error resending mode according to the available memory capacity.

Still another object of the present invention is to declare, to the destination unit, availability of communication function in the error correction mode according to the available memory capacity.

Still another object of the present invention is to alter the frame size in the error correction mode according to the available memory capacity.

Still another object of the present invention is to provide a facsimile apparatus capable of securing, in the memory reception mode, a memory space required for the error correction mode.

The foregoing and still other objects of the present invention, and the advantages thereof, will become fully apparent from the following description of embodiments, to be taken in conjunction with the attached drawings.

BRIEF DESCRIPTION OF THE DRAWINGS

FIGS. 2-1A, 2-1B, 2-2, 2-3, 2-4, 2-5, 2-6, 2-7 are flow charts showing control sequences of a control circuit in said embodiment.

DETAILED DESCRIPTION OF THE PREFERRED EMBODIMENTS

The present invention will now be clarified in detail by an embodiment shown in the attached drawings.

At first the outline of said embodiment will be explained.

The present embodiment utilizes, in common, a memory space for the substituted reception in the normal G3 mode and in the error correction mode (ECM).

Let us consider a case in which said memory space has a capacity of 2 Mbits or 256 Kbytes. The communication in the error correction mode requires the following memory space. In the error correction mode, encoded data of a predetermined number of bytes are treated as frame information, which may be 64 bytes or 256 bytes. Said frames are collected, up to 256 frames at maximum, as a unit block for data transmission at a time. The receiver unit has to have a function of transmission with 256 bytes in a frame. Consequently there is at least required a memory of 256 bytes×256 blocks = 64 Kbytes. This corresponds to the control with single buffer, and, there will be required a memory capacity of 128 Kbytes for double buffer control. On the other hand, the transmitter unit may select transmission with 64 bytes for a frame. In this case there is required a memory capacity of 16 Kbytes for single buffer control, or 32 Kbytes for double buffer control in which two buffer memories are alternately used for receiving the image data.

In the receiver unit, when the available memory space X is at least equal to 64 Kbytes, that is, when substituted reception is conducted and the received and unprinted data occupy a memory space less than 192 Kbytes, the communication in the error correction mode is identified as possible and a signal "1" is set in the 27th bit of the FIF (facsimile information field) of the DIS (digital identification signal). Then, if the available memory space X is at least equal to 128 Kbytes when the transmitter unit selects the transmission in the error correction mode with 256 bytes in a frame (identified by the reception of a digital command signal (DCS) with "1" in the 27th bit and "0" in the 28th bit in the facsimile information field), the image data are received and recorded with the double buffer control. On the other hand, if the available memory space is at least equal to 64 Kbytes, but less than 128 Kbytes, the image data are received and recorded with the single buffer control. When the transmitter unit selects the transmission in the error correction mode with 64 bytes in a frame (identified by the reception of a DCS with "1" in the 27th and 28th bits in the FIF), the image data are received and recorded with the double buffer control.

Also, when the available memory space X is less than 64 Kbytes, that is, when substituted reception is conducted and the received and unprinted data occupy a memory spaces at least equal to 192 Kbytes, the communication in the error correction mode is identified as not possible and a signal "0" is set in the 27th bit of the FIF of the digital identification signal.

Upon selecting the transmission in the error correction mode, the transmitter unit discriminates whether the receiver unit has the error correction mode function. The function will be as follows if the receiver unit has such function. If the available memory capacity in the transmitter unit is at least equal to 16 Kbytes but less than 32 Kbytes, the transmission is conducted with 64 bytes for a frame with single buffer control, by setting of "1" in the 27th and 28th bits of the facsimile information field (FIF) of the digital command signal (DCS). If said available memory capacity is at least equal to 32 Kbytes but less than 64 Kbytes, the transmission is conducted with 64 bytes for a frame with double buffer control, by setting of "1" in the 27th and 28th bits of the FIF of the DCS. If said available memory capacity is at least equal to 64 Kbytes but is less than 128 Kbytes, the transmission is conducted with 256 bytes for a frame with single buffer control, by setting of "1" in the 27th bit and "0" in the 28th bit of the FIF of the DCS.

If the recording sheet runs out in the course of data recording in the normal G3 mode, the substituted reception is conducted in the entire memory space. On the other hand, if the recording sheet runs out in the course of data recording in the error correction mode, the control is switched to the single buffer control, and the substituted reception is conducted in the entire memory space, excluding however a memory space required for error correction.

In the following the present invention will be clarified further by an embodiment thereof shown in the attached drawings.

FIG. 1 is a block diagram of a facsimile apparatus embodying the present invention.

Referring to FIG. 1, there are shown a network control unit (NCU) 2 to be connected to a communication channel for connection control of a telephone exchange network, switching to a data communication channel and loop maintenance for the purpose of utilizing the telephone network in data communication; and a telephone channel (or a telephone line) 2a. The NCU 2 receives a signal from a signal line 36a, and makes a connection from a signal line 2a to a signal line 2b, namely from the telephone line to a telephone unit if said signal is "0", or makes a connection from the signal line 2a to a signal line 2c, namely from the telephone line to the facsimile apparatus if said signal is "1". In the normal state the telephone line is connected to the telephone unit.

4 is a telephone unit.

6 is a hybrid circuit for separating received signals from signals to be transmitted. The signals to be transmitted from the signal line 20a are sent to the telephone line through the signal line 2c and the NCU 2. Also the received signals are supplied to a signal line 6a through the NCU 2 and the signal line 2c.

8 is a reading circuit, which reads image signals of a main scanning line from an original document in succession and prepares a signal train representing two values of white and black. Said circuit is composed of an image sensor (or image pick-up device) such as CCD and an optical system. The obtained binary signal train is supplied to a signal line 8a.

10 is a circuit for receiving the image data through the signal line 8a and releases encoded data (MH (modified Huffman) encoding or MR (modified Reed) encoding) to a signal line 10a.

12 is an image memory circuit of 2M bits, utilized in the substituted reception and in the transmission in the error correction mode. Said image memory 12 is used or not used, respectively when the signal level of a signal line 36j is "1" or "0".

The available memory capacity is supplied to a Y-signal line 12c. In the following there will be explained a case in which the use of said image memory is selected by a signal "1" on the signal line 36j.

A signal "0" on a signal line 36k indicates the substituted reception with said image memory, while a signal "1" on said signal line 36k indicates a communication with the error correction mode (ECM). In the latter case, the transmission or reception is selected respectively by a signal "0" or "1" on a signal line 36l. Also the transmission with 64 octets or 256 octets or 256 octets per frame is selected respectively by a signal "0" or "1" on a signal line 36h. Besides a single buffer process or a double buffer process is selected respectively by a signal "0" or "1" on a signal line 36i.

In the following there will be explained the flow of data in the substituted reception. If the recording sheet runs out or is absent in the recording of received data in the normal G3 mode, and if the substituted reception is possible, the image memory 12 receives and stores the data of the signal line 22a, thereby effecting the substituted reception. After said reception, when an instruction for the output of received data is given to a signal line 36g, the stored data are release to a signal line 12b and recorded.

The flow of data in the transmission with the error correction mode is as follows. The encoded data supplied to the signal line 10a are stored in the memory, and the frame information of a frame number instructed on a signal line 36d is supplied to the signal line 12a.

The flow of data in the reception with the error correction mode is as follows. The frame data supplied to a signal line 26a are stored in a corresponding image memory space, and said data are released in succession to the signal line 12b as long as the frame does not contain an error.

14 is a circuit for adding an address field, a control field, a facsimile control field (FCF) and a facsimile information field (FIF) (containing the number of frame under transmission) in front of the encoded data supplied to the signal line 12a, and release these data, in HDLC (high level data link and control) format, to a signal line 14a. Also said HDLC framing circuit 14 sends a flag, for the flow control of the transmitter unit, to the signal line 14a when a signal "1" is given on a signal line 36e.

16 is a modulator for effecting modulation according to known CCITT recommendation V27ter (differential phase modulation) or V29 (orthogonal modulation). The modulator 16 modulates the signals on the signal line 10a or on the signal line 14a and releases the modulated data to a signal line 16a, respectively when the signal on a signal line 36c is "0" or "1".

18 is a modulator for modulation accoding to known CCITT recommendation V21. The modulator 18 modulates sequence signals from a signal line 36b and supplies the modulates data to a signal line 18a.

20 is an adder circuit receiving the signals from the signal lines 16a, 18a and releasing the result of addition to a signal line 20a.

22 is a demodulator for effecting demodulation according to the known CCITT recommendation V27ter (differential phase modulation) or V29 (orthogonal modulation). The demodulator 22 demodulates the signal from a signal line 6a, and releases the demodulated data to a signal line 22a.

24 is an HDLC deframing circuit for receiving the demodulated data from the signal line 22a, effecting zero deletion of the HDLC data, and releasing data prior to HDLC formatting to a signal line 24a.

26 is a temporary memory circuit for temporarily storing encoded image data supplied from the signal line 24a, in the unit of a frame. The data properly received in the unit of a frame are released to a signal line 26a.

28 is a circuit for receiving the demodulated data from the signal line 22a when a signal "0" is given on the signal line 36f, or the demodulated data from the signal line 12b when a signal "1" is given on the signal line 36f and a signal "0" is given on the signal line 36g, or the substituted reception data from the signal line 12b when a signal "1" is given on the signal line 36f and a signal "1" is given on the signal line 36g, and sending demodulated data (modified Huffmann (MH) decoding or modified Reed (MR) decoding) to a signal line 28a.

30 is a recording circuit for receiving the signals from the signal line 28a and effecting recording line by line. The circuit 30 releases a signal "1" to a signal line 30a upon detection of a black belt of a near-end mark, but releases a signal "0" in the absence of said detection.

32 is a demodulator for effecting demodulation according to the known CCITT recommendation V21. The demodulator 32 receives the signals from the signal line 6a, effects the V21 demodulation and releases the demodulated data to a signal line 32a.

34 is a circuit for discriminating whether the communication in the error correction mode is selected in the transmitter unit. Said circuit releases a signal "1" or "0" to a signal line 34a, respectively when the transmission in the error correction mode is selected or not in the transmitter unit.

36 is a control circuit principally for the controls explained before, and is composed of a microcomputer with peripheral devices such as a ROM for storing control programs and a RAM for temporary storage of data.

Figure 1A:
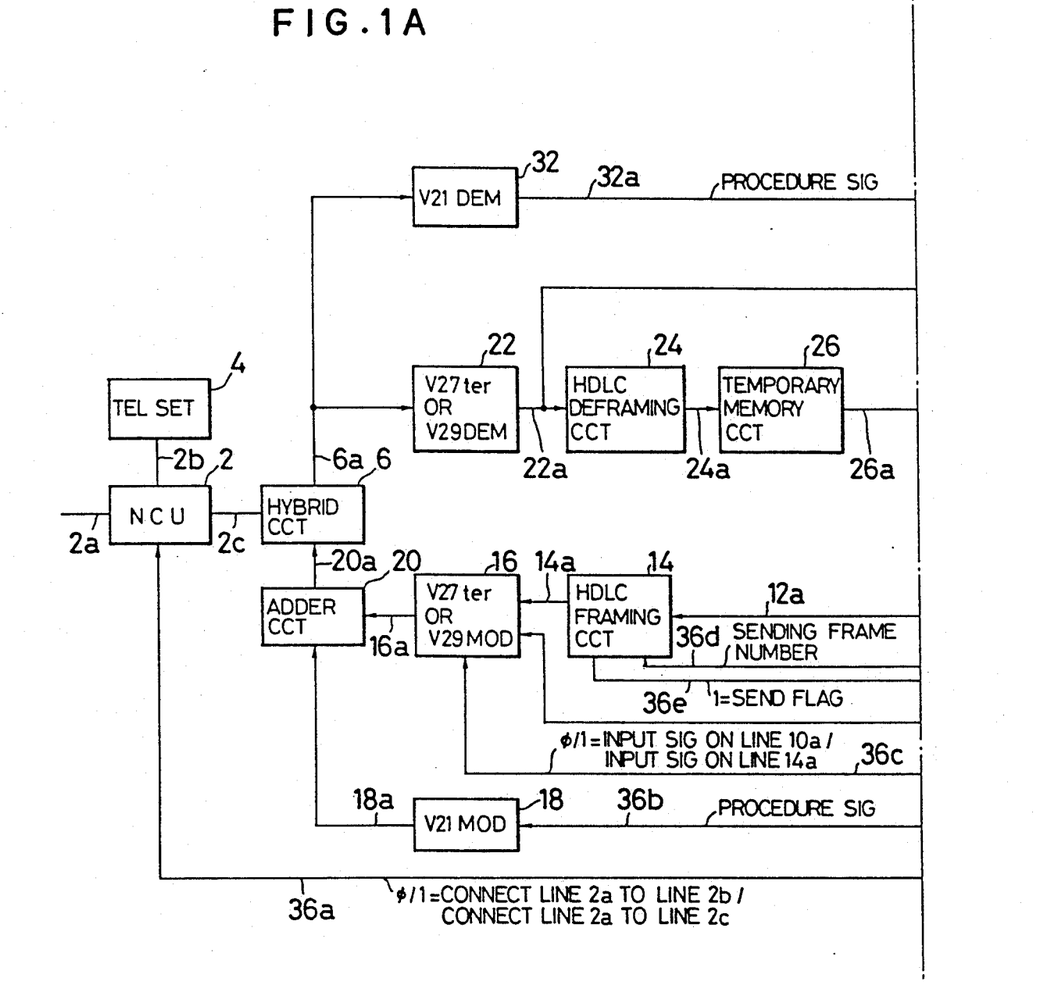
FIG. 1A, 1B is a block diagram of a facsimile apparatus embodying the present invention.
Figures 1A, 2, 21:
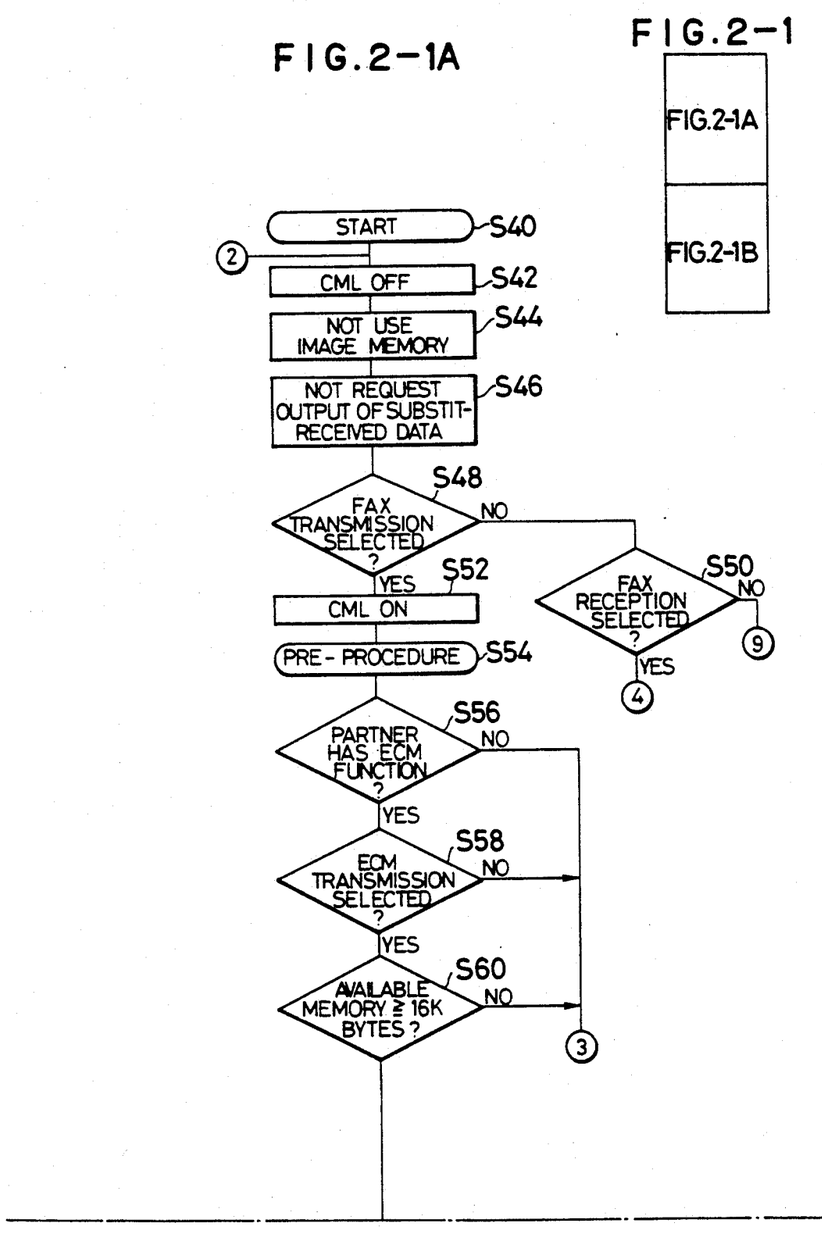
Figure 1B:
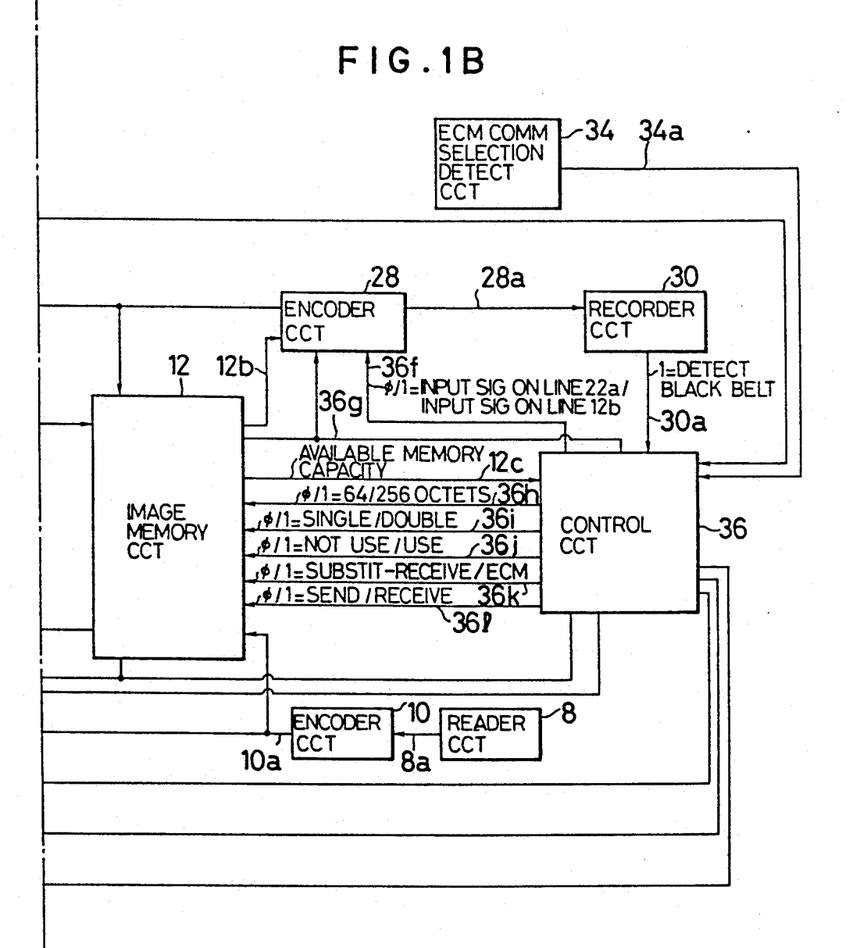
Figures 1B, 2:
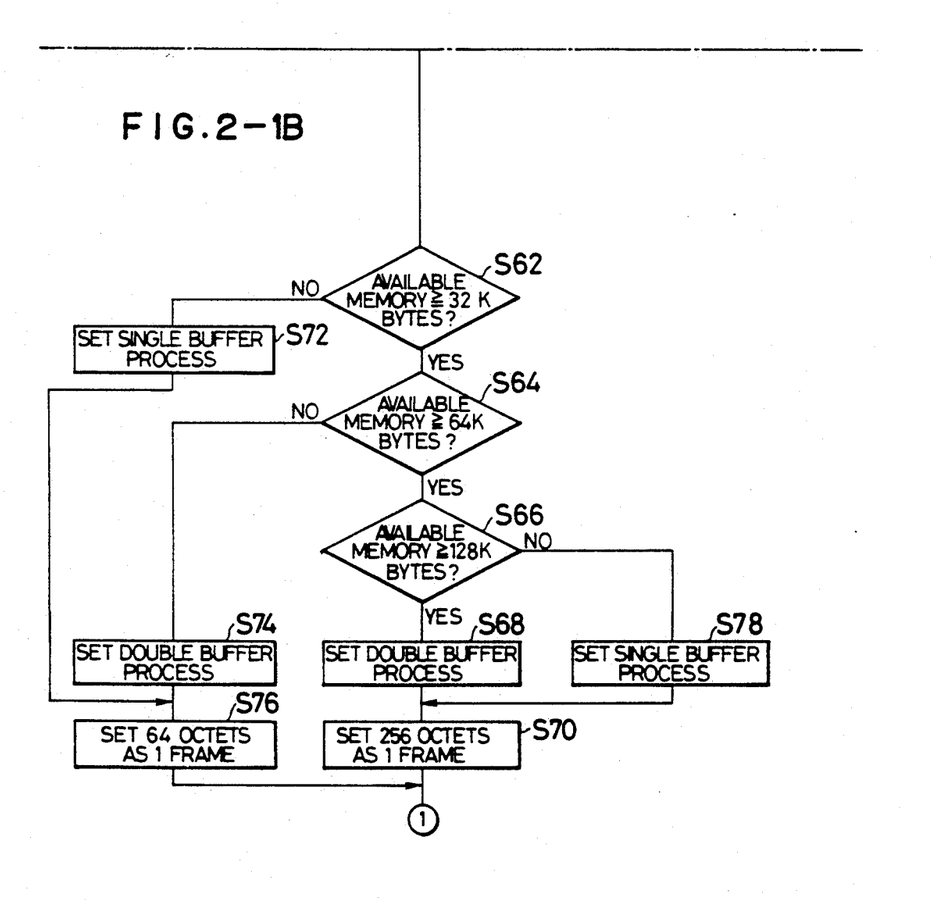
Figure 22:
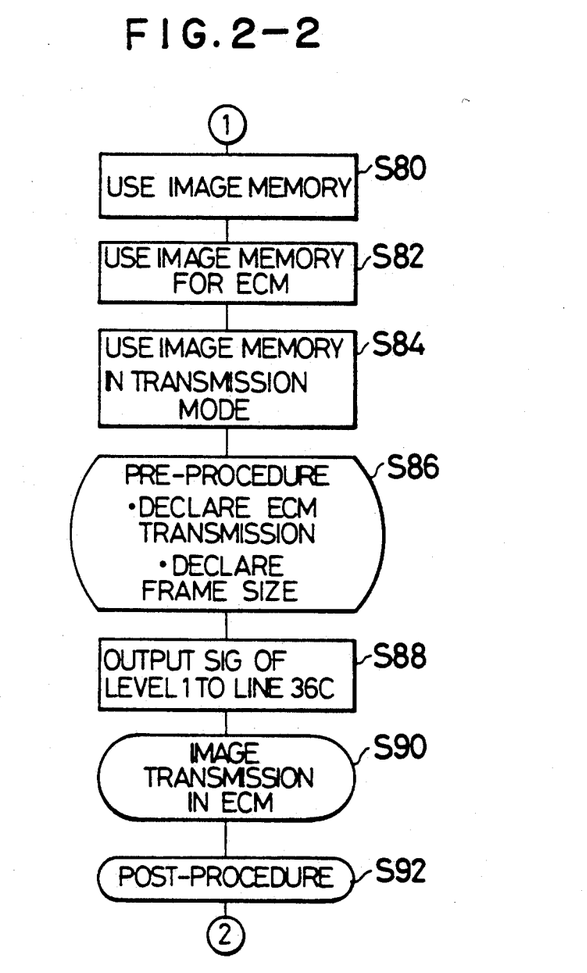
Figure 23:
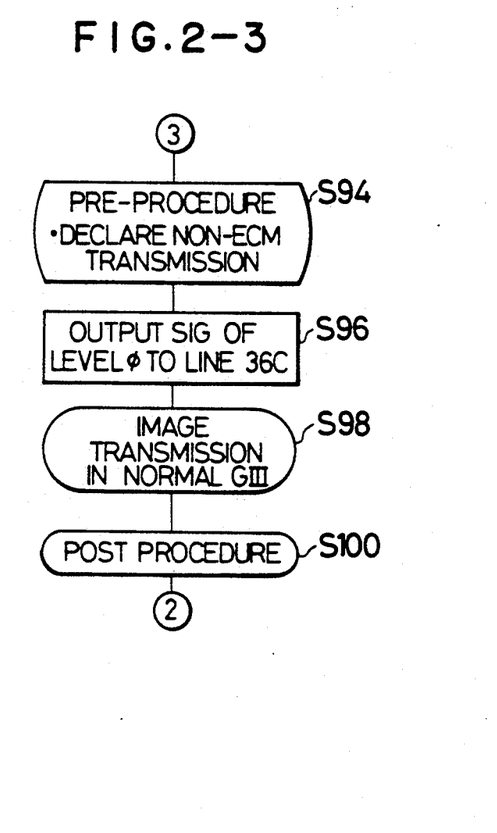
Figure 24:
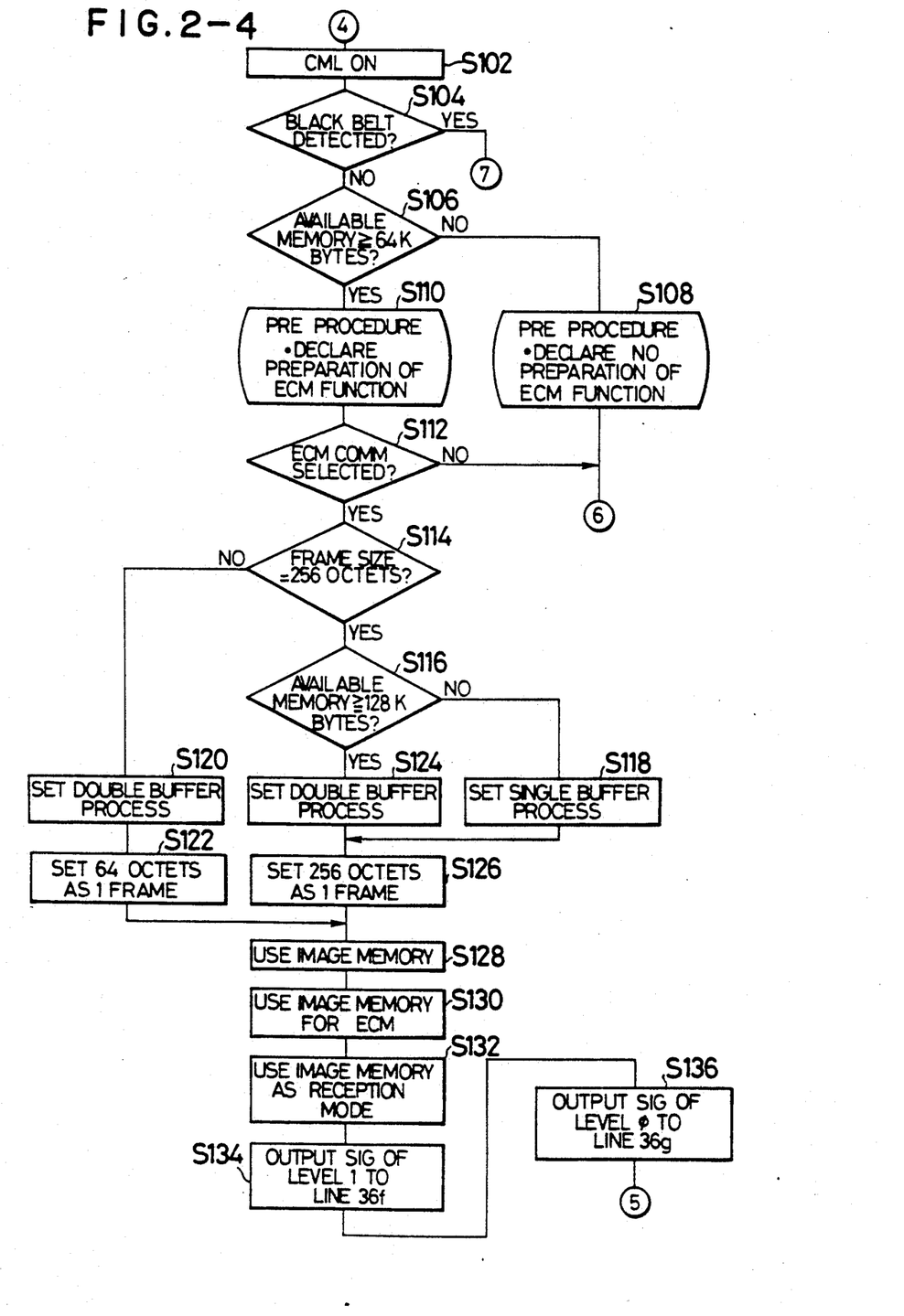
Figure 25:
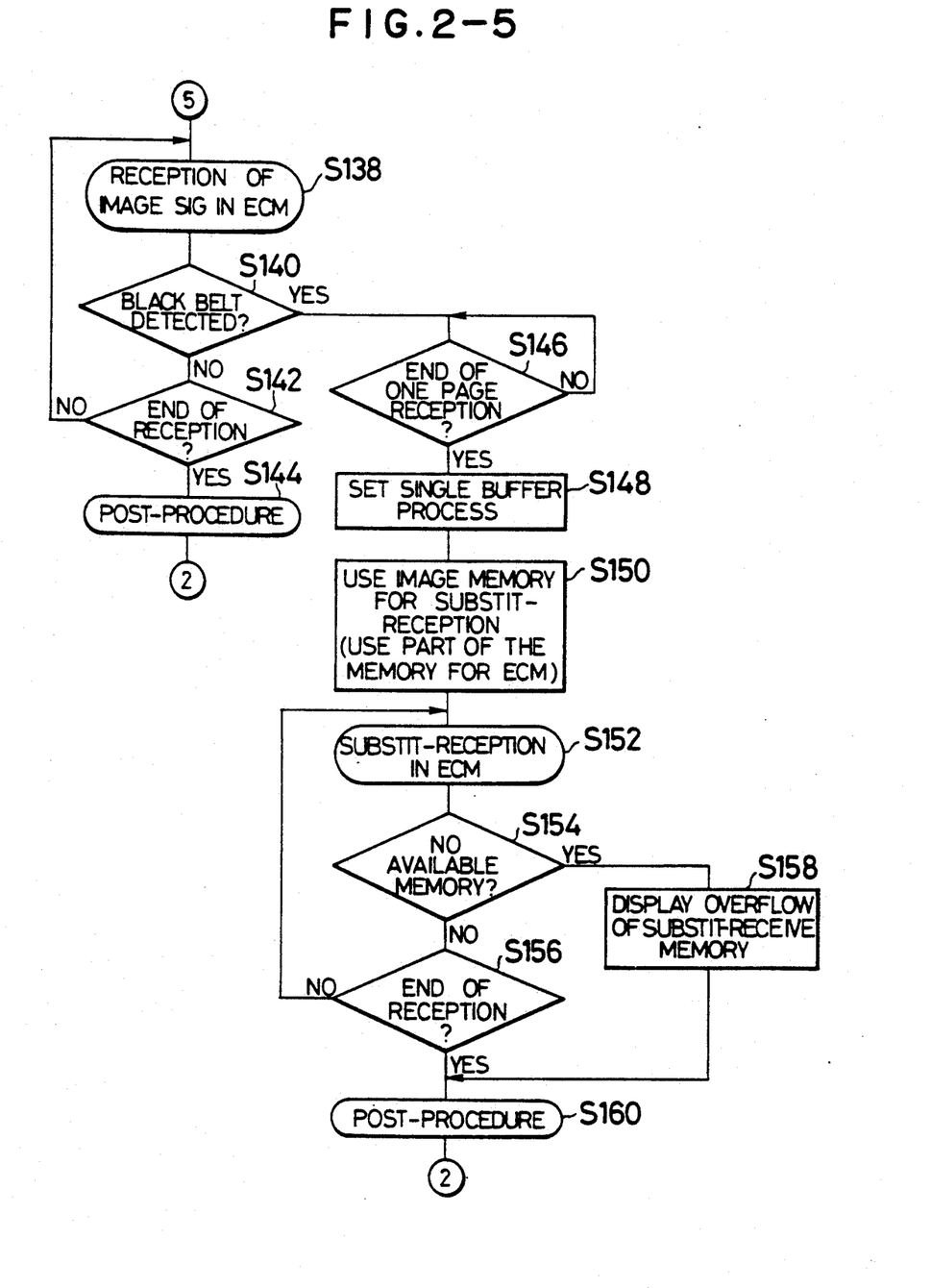
Figure 26:
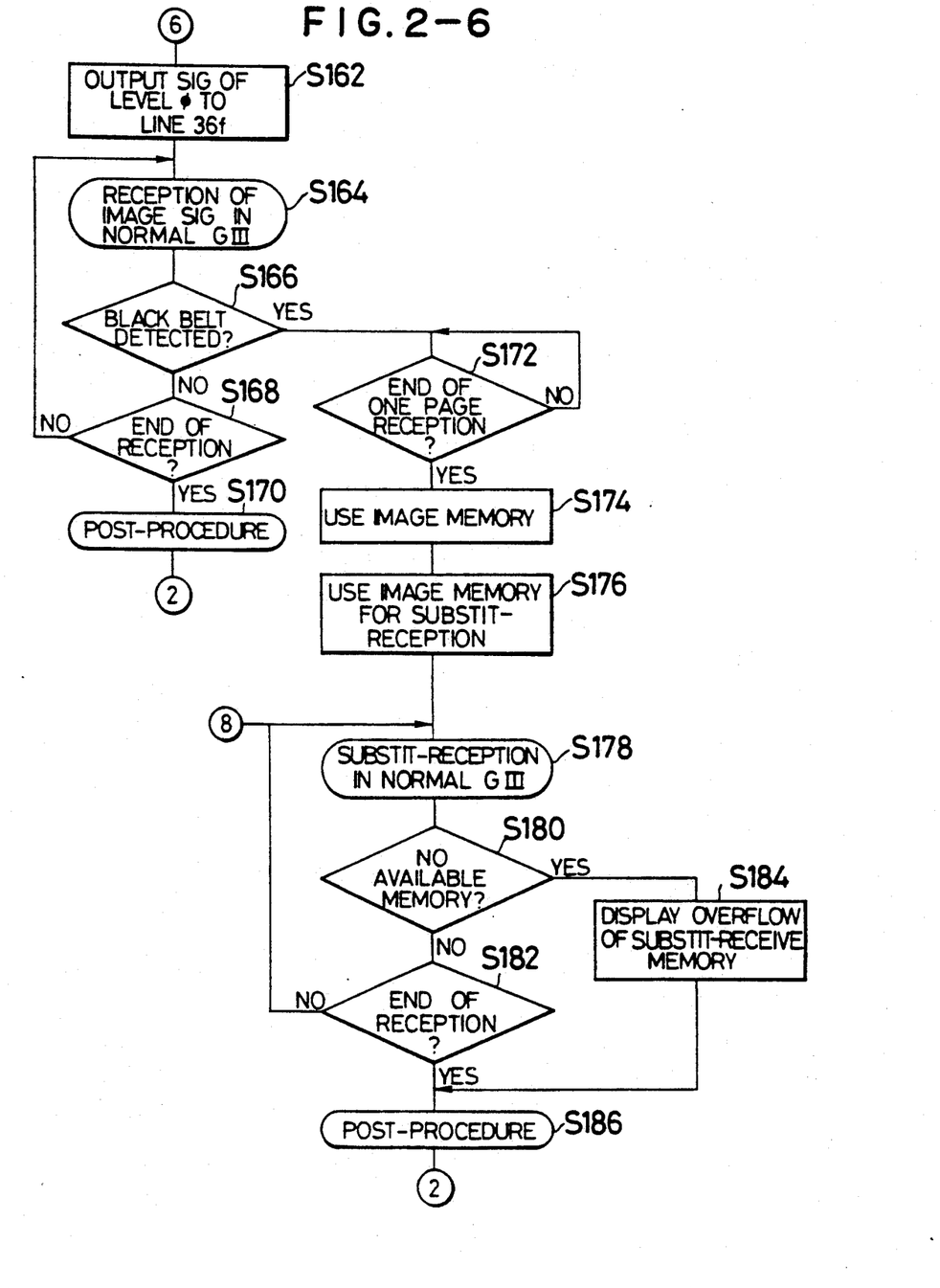
Figure 27:
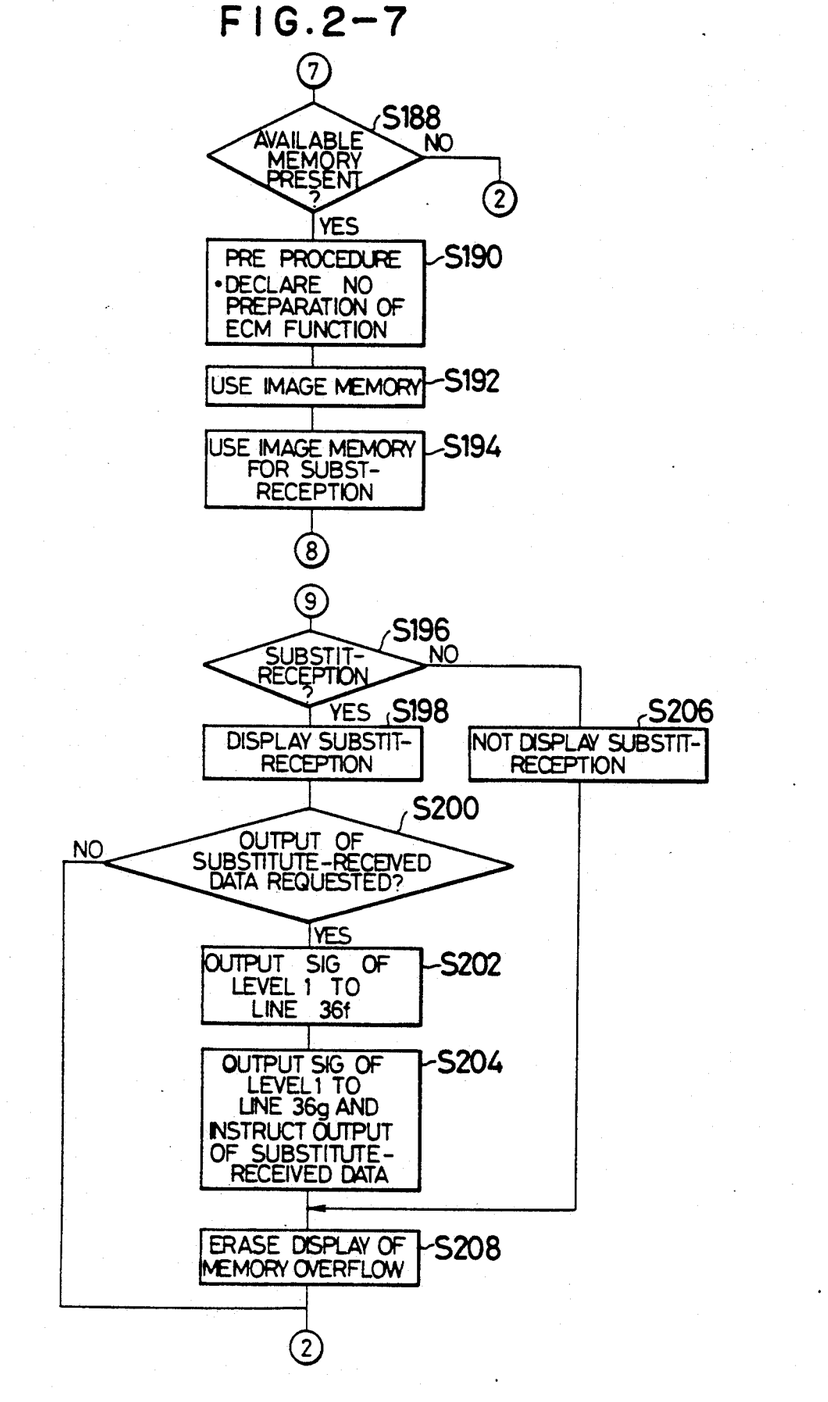

FIG. 2 shows flow charts of the control sequence of the control circuit shown in FIG. 1.

Referring to FIG. 2, the control sequence is started at a step S40. Then a step S42 releases a signal "0" to the signal line 36a and turns off CML.

Subsequently a step S44 releases a signal "0" to the signal line 36j, thus selecting non-use of the image memory.

A step S46 releases a signal "0" to the signal line 36g, thus selecting a state without substituted reception.

Then a step S48 discriminates whether facsimile transmission has been selected, and the sequence proceeds to a step S52 or S50 respectively if the facsimile transmission is selected or not.

In the latter case, the step S50 discriminates whether facsimile reception has been selected, and the sequence proceeds to a step S102 or S196, respectively if the facsimile reception is selected or not.

On the other hand, in the former case, the step S52 releases a signal "1" to the signal line 36a and turns on CML.

Then a step S54 executes a preliminary sequence of the facsimile communication procedure according to the CCITT recommendation T30.

Then a step S56 discriminates whether the partner unit has the error correction mode function, by analyzing the digital identification signal (DIS) of said unit, and the sequence proceeds to a step S58 if the partner unit is identified to have the error correction mode function, based on "1" in the 27th bit in the facsimile information field of said signal. On the other hand, the sequence proceeds to a step S94 if the partner unit is identified to lack said error correction mode, based on "0" in said 27th bit.

In the former case, the step S58 discriminates whether the transmission in the error correction mode has been selected, from the signal of the signal line 34a, and the sequence proceeds to a step S60 or S94, respectively when said signal is "1" indicating the of transmission in the error correction mode, or "0" indicating the absence of said selection.

The step S60 discriminates, by receiving the signal from the signal line 12c, whether the available memory capacity is at least equal to 16 Kbytes. Then the sequence proceeds to a step S62 or S94 respectively if the available memory capacity is at least equal to or less than 16 Kbytes. Since the transmission in the error correction mode is not possible if said capacity is less than 16 Kbytes, the communication is made in the normal G3 mode.

Then steps S62, S64 and S66 identify the available memory capacity. If it is at least equal to 16 Kbytes but less than 32 Kbytes, the single buffer process is selected by a signal "0" on the signal line 36i, and 64 octets are selected for a frame by a signal "0" on the signal line 36th (steps S72 and S76).

If the available memory capacity is at least equal to 32 Kbytes but less than 64 Kbytes, there are selected the double buffer process by a signal "1" on the signal line 36i, and 64 octetes for a frame by a signal "0" on the signal line 36h (steps S74 and S76).

If the available memory capacity is at least equal to 64 Kbytes but less than 128 Kbytes, there are selected the single buffer process by a signal "0" on the signal line 36i, and 256 octets for a frame by a signal "1" on the signal line 36h (steps S78 and S70).

If the available memory capacity is equal to or larger than 128 Kbytes, there are selected the double buffer process by a signal "1" on the signal line 36h, and 64 octets for a frame by a signal "1" on the signal line 36h (steps S68 and S70).

When the sequence proceeds from the step S76 or S70 to S80, said step S80 releases a signal "1" on the signal line 36j, thus selecting the use of the image memory.

Then a step S82 releases a signal "1" on the signal line 36k, indicating the use of the image memory for the error correction mode.

Also a step S84 releases a signal "0" on the signal line 36l, indicating the use of the image memory in the transmission mode.

Subsequently a step S86 executes the preliminary procedure. In the facsimile information field of the digital command signal (DCS), the 27th bit is set at "1" to declare the transmission in the error correction mode. Also the 28th bit is set at "0" or "1" respectively when a frame is composed of 256 octets or 64 octets.

A step S88 releases a signal "1" to the signal line 36c, thereby causing the V27ter/V29 modulator 16 to modulate the signal from the line 14a.

Then a step S90 executes the image transmission in a mode set by the preliminary procedure in the error correction mode. Upon completion of the image transmission, a step S92 executes a post procedure, and the sequence returns to the step S42.

On the other hand, when the sequence proceeds from the step S56, S58 or S60 to S94, said step S94 executes the preliminary procedure. In the facsimile information field of the digital command signal, the 27th bit is set at "0", thus declaring the absence of transmission in the error correction mode.

After the preliminary procedure, a step S96 releases a signal "0" to the signal line 36c, thereby setting the V27ter/V29 modulator 16 in a mode for modulating the signal from the signal line 10a. Then a step S98 executes image transmission in the normal G3 mode. After the completion of image transmission, a step S100 executes the post procedure.

When the sequence proceeds from the step S50 to S102, said step S102 releases a signal "1" to the signal line 36a and turns on CML.

Then a step S104 discriminates whether the signal on the line 30a is "1" indicating the detection of a black belt indicating that the remaining amount of the recording sheet is less than a predetermined amount, and the sequence proceeds to a step S188 or S106 respectively if the signal of said line 30a is "1" or "0".

The step S106 conforms the available memory capacity by receiving the signal of the line 12c, and the sequence proceeds to a step S110 or S108, respectively if the available memory capacity.

Then a step S108 executes the preliminary sequence. In the facsimile information field of the digital information signal, the 27th bit is set at "0", indicating the absence of the error correction mode function, and the sequence proceeds to a step S162.

On the other hand, in case the sequence proceeds from the step S106 to S110, there is also executed the preliminary procedure, but said 27th bit of the DIS is set at "1" in this case, indicating the presence of the error correction mode.

When the sequence proceeds from the step S110 to S112, the digital command signal from the partner unit is analyzed to discriminate whether the communication in the error correction mode is selected in the transmitter unit, and the sequence proceeds to a step S114 or S162, respectively when said 27th bit. is "1" indicating the selection of the error correction mode in the transmitter unit, or "0" indicating the non-selection of said mode.

When the sequence proceeds to from the step S112 to S114, said step S114 discriminates whether the 28th bit is "0", indicating that the designated frame size is 256 octets. The sequence then proceeds to a step S116 or S120, respectively when said 28th bit is "0" indicating that the frame size is 256 octets, or "1" indicating that said frame size is 64 octets.

When the sequence proceeds from the step S114 to S116, said step S116 discriminates whether the available memory capacity is at least equal to 128 Kbytes, and the sequence proceeds to a step S124 or S118, respectively if the available memory capacity is at least equal to or less than 128 Kbytes.

The step S118 releases a signal "0" to the signal line 36i to effect the single buffer process, and the sequence proceeds to a step S126.

On the other hand, when the sequence proceeds from the step S114 to S120, said step S120 releases a signal "1" to the signal line 36i, for effecting the double buffer process. Then a step S122 releases a signal "0" to the signal line 36n, indicating that the frame size is 64 octets, and the sequence proceeds to a step S128.

When the sequence proceeds from the step S116 to S124, a signal "1" is released to the signal line 36i to effect the double buffer process, and the sequence proceeds to a step S126.

The step S126 releases a signal "1" to the signal line 36h, indicating that the frame size is 256 octets, and the sequence proceeds to a step S128.

The step S128 releases a signal "1" to the signal line 36j, thus selecting the use of the image memory.

Then a step S130 releases a signal "1" to the signal line 36k, selecting the use of the image memory for the error correction mode, and the sequence proceeds to a step S132.

The step S132 releases a signal "1" to the signal line 36l, thus selecting the use of the image memory in the reception mode. Then a step S134 releases a signal "1" to the signal line 36f, instructing the decoder circuit 28 to decode the signal from the line 12b.

Subsequently a step S136 releases a signal "0" to the signal line 36g, indicating the non-selection of output of the substituted reception data. Then a step S138 executes the image signal reception in the error correction mode.

A step S140 then receives the signal from the line 30a and discriminates the detection of black belt. The sequence then proceeds to a step S146 or S142, respectively if the signal on the line 30a is "1" indicating the detection of black belt, or "0" indicating the non-detection.

The step S142 discriminates whether the reception has been completed, and the sequence returns to the step S138 or proceeds to a step S144, respectively if the reception has been completed or not.

The step S144 executes the post procedure, and the sequence thereafter returns to the step S42.

On the other hand, when the sequence proceeds from the step S140 to S146, said step S146 discriminates whether the reception of a page, for which the black belt was detected in the course of reception, has been completed, and if completed, the sequence proceeds to a step S148.

The step S148 releases a signal "0" to the signal line 36i, thus selecting the signal buffer process.

Then a step S150 releases a signal "0" to the signal line 36k, thus selecting the use of the image memory for substituted reception. In this case the reception is conducted in the error correction mode and the received data are stored in the image memory, so that the memory capacity of a single buffer is utilized for the error correction mode.

Then a step S152 executes the reception of image signals in the error correction mode.

Subsequently a step S154 receives the signal from the line 12c, thereby discriminating whether the available memory capacity has been used up for the substituted reception. If said capacity has been used up, the sequence proceeds to a step S158 for displaying a message for the overflow state of the memory for substituted reception, and then to a step S160. If the image memory is still available, the sequence proceeds to a step S156.

The step S156 discriminates whether the reception has been completed, and the sequence proceeds to a step S160 or returns to S152, respectively when the reception has been completed or not.

The step S160 executes the post procedure, and the sequence thereafter returns to the step S42. On the other hand, when the sequence proceeds from the step S108 or S112 to S162, said step S162 releases a signal "0" to the signal line 36f, instructing the decoder circuit 28 to decode the data supplied through the signal line 22A. Then a step S164 executes the reception of image signal in the normal G3 mode, and, upon completion thereof, the sequence proceeds to a step S166.

The step S166 discriminates the detection of the black belt, based on the signal on the line 30a, and the sequence proceeds to a step S172 or S168, respectively when the signal on the line 30a is "1" indicating the detection of black belt or "0" indicating the absence of detection.

The step S168 discriminates whether the reception has been completed, and, if completed, the sequence proceeds to a step S170 for effecting the post procedure and then returns to the step S42. If the reception has not been completed, the sequence returns to the step S164. When the sequence proceeds from the step S166 to S172, said step S172 discriminates whether the reception of page information for which the black belt was detected in the course of reception has been completed, and, if completed, the sequence proceeds to a step S174.

The step S174 releases a signal "1" to the signal line 36j, thereby selecting the use of the image memory, and a step S176 releases a signal "0" to the signal line 36k for selecting the use of the image memory for the substituted reception. When the sequence proceeds from the step S176 to S178, said step S178 executes the substituted reception in the normal G3 mode.

Upon completion of the substituted reception in the normal G3 mode, a step S180 receives the signal from the line 12c, thereby discriminating whether the availble image memory has been used up. If it is used up, a step S184 displays a message indicating the overflow state of the memory for substituted reception, and the sequence proceeds to a step S186.

On the other hand, if the step S180 discriminates the presence of available memory capacity, a step S182 discriminates whether the reception has been completed. If the reception has been completed, the sequence proceeds to a step S186 for effecting the post procedure, and then returns to the step S42. If the reception has not been completed, the sequence returns to a step S178.

When the sequence proceeds from the step S104 to S188, said step S188 receives the signal from the signal line 12c, thereby discriminating whether memory capacity is available. The sequence proceeds to a step S190 if there is available memory capacity, or returns to the step S42 if there is no available memory capacity, since reception is not possible.

When the sequence proceeds from the step S188 to S190, said step S190 executes the preliminary procedure and sets "0" in the 27th bit of the facsimile information field of the DIS, thereby declaring the absence of the error correction mode function.

Then a step S192 releases a signal "1" to the signal line 36j, thereby selecting the use of the image memory. Then a step S194 releases a signal "0" to the signal line 36k, thereby selecting the use of the image memory for the substituted reception and the sequence returns to the step S178.

On the other hand, when the sequence proceeds from the step S50 to S196, said step S196 discriminates whether the substituted reception has been conducted and thus received data have been stored in the image memory. If the image memory stores the data received by substituted reception, the sequence proceeds to a step S198 for displaying that the substituted reception is conducted, and then to a step S200. On the other hand, if the image memory does not store such data, the sequence proceeds to a step S206 for displaying that the substituted reception is not conducted, and then to a step S208.

The step S200 discriminates whether there has been a request for the output of the data obtained by substituted reception, and the sequence proceeds to a step S202 or returns to the step S42 respectively when said request is present or absent.

The step S202 releases a signal "1" to the signal line 36f, whereby the decoding circuit 28 decodes the signal from the line 12k. Then a step S204 releases a signal "1" to the signal line 36y, thus giving instruction for the output of the data received by substituted reception.

The step S208 clears the display for the overflow state of the memory for substituted reception, and the sequence returns to the step S42.

In the foregoing embodiment, the memory means is used in common for the error correction mode and for the substituted reception. However, it is also possible to use the memory means in common for the memory reception or transmission mode and for the error correction mode.

Also in the foregoing embodiment, if the recording sheet runs out in the course of recording of the received data in the error correction mode, there is conducted substituted reception in all the memory space except the memory space required for error correction, but it is also possible to effect the substituted reception eventually utilizing the memory space for memory correction.

Furthermore, in the foregoing embodiment, the communication in the error correction mode is identified possible or not possible respectively if the available memory capacity is at least equal to a predetermined amount or less than said amount.

Also if the recording sheet runs out in the course of recording of the received data in the error correction mode, there is conducted substituted reception in all the memory space except the memory space required for error correction.

However, if the recording sheet runs out in the course of recording of the received data in the error correction mode (more specifically if the near-end mark of the recording sheet is detected and the reception is completed for the page of said near-end mark), the substituted reception is not conducted and the reception is interrupted. Stated differently, the substituted reception is conducted only in the normal G3 mode.

Furthermore, the error correcting function is identified present or absent respectively when the substituted reception is conducted or not. This assumes the presence of the recording sheet, in case of a receiver unit. In case the recording sheet is absent, it is possible to enalbe the reception only in the normal G3 mode if the memory for substitued reception is available, and to disable the reception of said memory is not available.

In this manner the embodiment explained above enables efficient utilization of the memory and still enables efficient communication.

The present invention is not limited to the foregoing embodiment but is subject to various modifications.

What is claimed is:

1. A facsimile apparatus comprising:
   communication means for transmitting image information to a destination apparatus and receiving image information from a source apparatus, said communication means transmitting and receiving image information in an error correction mode in which errors in image information received from the source apparatus or in image information transmitted to the destination apparatus are corrected by re-reception and retransmission of the respective image information, and a mode other than the error correction mode, said communication means receiving and transmitting image information in a communication sequence having a selected organization of the image information therein;
   memory means for storing image information received or transmitted by said communication means; and
   control means for detecting an available memory capacity of said memory means and changing the communication sequence of said communication means in the error correction mode to select the organization of image information therein to enable said memory means to store received and transmitted image information in accordance with the detected available memory capacity;
   wherein said memory means is used in the mode other than the error correction mode as well as in the error correction mode, and the memory capacity detected as being available in said memory means for the error correction mode is varied in accordance with a memory usage requirement of the other mode.

2. An apparatus according to claim 1, wherein said mode other than the error correction mode is a memory reception mode in which received image information is stored and held in said memory means.

3. A facsimile apparatus according to claim 2, wherein said control means selects the organization of image information by modifying a frame size in the communication of image information in said error correction mode, so as to be accommodated in the detected available capacity of said memory means.

4. A facsimile apparatus according to claim 2, further comprising:
   recording means for recording image information on a recording material; and
   mode switching means for determining the remaining amount of said recording material and for automatically selecting said memory communication mode when said remaining amount becomes equal to or less than a predetermined amount.

5. An apparatus according to claim 4, wherein a selected memory area of said memory means is designated for storage of received and transmitted image information in the error correction mode at the switching of modes by said mode switching means and, with the exception of said selected memory area, said memory means is used in the memory communication mode.

6. An apparatus according to claim 1, wherein said control means enables communication in the error correction mode in the event the available capacity of said memory means is at least equal to a predetermined amount.

7. An apparatus according to claim 1, wherein said control means disables communication in the error correction mode in the event the available capacity of said memory means is less than a predetermined amount.

8. An apparatus according to claim 1, further comprising transmission means for transmitting information indicating transmission capabilities of said apparatus, wherein said transmission means transmits, to the destination apparatus, information indicating whether communication in the error correction mode is possible or not, based on the detected available memory capacity.

9. A facsimile apparatus comprising:
   memory means for storing image information;
   communication means for transmitting image information to a destination apparatus and receiving image information from a source apparatus, said communication means transmitting and receiving image information in an error correction mode in which errors in image information received from the source apparatus or in image information transmitted to the destination apparatus are corrected by re-reception and retransmission of the respective image information, said communication means receiving and transmitting image information in a communication sequence having a selected organization of the image information therein; and
   control means for detecting an available memory capacity of said memory means, and changing the communication sequence in the error correction mode to select the organization of image information therein to enable said memory means to store received and transmitted image information in accordance with the detected available memory capacity.

10. A facsimile apparatus according to claim 9, wherein said control means designates a portion of the available memory capacity of said memory means to store received and transmitted image information in the error correction mode according to the available memory capacity of said memory means.

11. A facsimile apparatus according to claim 9, wherein said control means enables communication of image information in the error correction mode in the event the available memory capacity of said memory means is at least equal to a predetermined amount.

12. A facsimile apparatus according to claim 9, wherein said control means disables communication of image information in the error correction mode in the event the available memory capacity of said memory means is less than a predetermined amount.

13. A facsimile apparatus according to claim 9, further comprising transmission means for transmitting information indicating transmission capabilities of said apparatus, wherein said control means transmits, to the destination apparatus, information indicating whether the communication in the error correction mode is possible or not, based on the detected available memory capacity.

14. A facsimile apparatus according to claim 9, wherein said control means selects the organization of image information by modifying a frame size in the communication of image information in said error correction mode, so as to be accommodated in the available memory capacity of said memory means.

15. A facsimile apparatus comprising:
communication means for transmitting image information to a destination apparatus and receiving image information from a source apparatus, said communication means transmitting and receiving image information in an error correction mode in which errors in image information received from the source apparatus or in image information transmitted to the destination apparatus are corrected by re-reception and retransmission of the respective image information, said communication means receiving and transmitting image information in a communication sequence having a selected organization of the image information therein;
memory means for storing image information received and transmitted by said communication means in the error correction mode;
recording means for recording received image information received by said communication means on a recording material; and
control means for determining a remaining amount of said recording material to cause said memory means to store the received image information when the remaining amount is insufficient to record the received image information;
wherein said control means detects an available memory capacity of said memory means and changes the communication sequence of image information by said communicating means in the error correction mode to select the organization of image information therein to enable said memory means to store received and transmitted image information in accordance with the detected available memory capacity.

16. A facsimile apparatus comprising:
transmission means for transmitting image information to a destination apparatus in an error correction mode in which errors in image information transmitted to the destination apparatus are corrected by retransmission of the respective image information, said communication means transmitting image information in a communication sequence having a selected organization of the image information therein;
memory means for storing image information that is transmitted in the error correction mode;
means for sending a selected memory usage mode designation signal for designating how image information is to be communicated in the error correction mode; and
control means for detecting an available memory capacity of said memory means and controlling said sending means to select the memory usage mode designation signal in accordance with the detected available memory capacity.

17. An apparatus according to claim 16, wherein said control means selects and sends either a first mode designation signal for designating that image information is to be transmitted with a first frame size for storage in a respective memory area, or a second mode designation signal for designating that image information is to be transmitted with a second frame size for storage in a respective memory area, in accordance with the detected available memory capacity.

18. A facsimile apparatus comprising:
memory means for storing image information;
receiving means for receiving image information from a source apparatus in an error correction mode in which errors in image information received from the source apparatus are corrected by re-reception of the respective image information, said communication means receiving and transmitting image information in a communication sequence having a selected organization of the image information therein;
transmitting means for transmitting to the source apparatus data indicating a capability to receive image information in the error correction mode; and
control means for detecting in said memory means an available memory capacity, and controlling said transmitting means to transmit data indicating the capability to receive image information in the error correction mode when the detected available memory capacity exceeds a desired amount.

* * * * *

UNITED STATES PATENT AND TRADEMARK OFFICE
CERTIFICATE OF CORRECTION

PATENT NO.   : 5,220,439
DATED        : June 15, 1993
INVENTOR(S)  : TAKEHIRO YOSHIDA It is certified that error appears in the above-identified patent and that said Letters Patent is hereby corrected as shown below:

<u>IN [57] ABSTRACT</u>

Line 3, "mode, the" should read --mode, utilizing the--.

<u>COLUMN 5</u>

Line 16, "modulates" should read --modulated--.

<u>COLUMN 6</u>

Line 37, "the of" should read --the selection of--.
Line 54, "36th" should read --36h--.
Line 59, "64 octetes" should read --64 octets--.

Signed and Sealed this

Third Day of May, 1994

Attest:

BRUCE LEHMAN

*Attesting Officer*      *Commissioner of Patents and Trademarks*